United States Patent Office 2,849,470
Patented Aug. 26, 1958

2,849,470

OXY-DICYCLOPENTADIENYL COMPOUNDS OF TRANSITION METALS OF GROUPS VI TO VIII AND THEIR PREPARATION

Richard Edward Benson, Claymont, Del., assignor to E. I. du Pont de Nemours and Company, Wilmington, Del., a corporation of Delaware No Drawing. Application August 6, 1954
Serial No. 448,371

25 Claims. (Cl. 260—439)

This invention relates to a new class of organometallic compounds and more particularly to the hydroxy-substituted derivatives of organometallic compounds of transition metals of groups VI to VIII, inclusive, of the periodic table.

Organometallic compounds, in which the metal is directing linked to one or more organic radicals through carbon thereof, are not only of interest from a theoretical standpoint but also have many practical applications. Thus, tetraethyllead is widely used as an antiknock agent for internal combustion engines, and many mercury compounds have found use in the fungicide and/or pesticide art. Many organometallic derivatives of the elements of groups I and II of the periodic table have found fundamental use in chemical syntheses, both as reactants and catalysts. Until quite recently, however, very little was known concerning any stable organometallic compounds of transition metals of groups VI–VIII of the periodic table.

Dicyclopentadienyliron has been prepared (see Kealey and Pauson, Nature, 168, 1039 (1951), and Pauson, U. S. Patent 2,680,756) as have also some derivatives of this interesting organoiron compound, for instance, certain diacyl derivatives and the dicarboxylic acid [see Woodward et al., J. Am. Chem. Soc. 74, 3458 (1952)]. Other cyclopentadienylmetals have been made, e. g., dicyclopentadienylnickel (Thomas U. S. Patent 2,680,758), dicyclopentadienylruthenium (Wilkinson, J. Am. Chem. Soc. 74, 6146, 1952), and dicyclopentadienylcobalt (III) salts (Wilkinson, ibid., 6148). These various compounds are of special interest in many fields, such as antiknock agents, fungicides and pesticides and as intermediates to still other interesting and desirable organometallic compounds.

This invention has as an object the preparation of new organometallic compounds. A further object is the preparation of new resin intermediates. Another object is the preparation of new photographic developers. Other objects will appear hereinafter.

These objects are accomplished by the present invention of dicyclopentadienylmetal compounds wherein one atom of a transition metal of groups VI to VIII, inclusive, of the periodic table is directly and singly bonded to two cyclopentadiene nuclei, each carbon of which nuclei is a member of but one ring, through nuclear carbon of said nuclei, at least one of said nuclei having a nuclear carbon thereof singly and directly bonded to oxy oxygen, i. e., to hydroxyl, or salt, ester, or ether thereof.

This new class of compounds can conveniently be prepared by the process wherein a five membered mononuclearly unsaturated, carbocyclic ketone having at least two hydrogens on annular carbon wherein the carbons of the carbonyl containing, 5 membered ring are members of that ring only, i. e., a cyclopentenone, are metallated by bringing the ketone in contact with two molar proportions of an alkali metal amide in liquid ammonia and the resulting dialkali metallated product is reacted with a substantially equimolar proportion of a salt of the desired transition metal of groups VI to VIII.

The following examples in which parts are by weight are illustrative of the invention.

EXAMPLE I

Part A.—Preparation of bis(1-benzoyloxy-3-methylcyclopentadienyl)iron

To a vigorously stirred suspension of 16 parts of sodium amide (from 9.4 parts of sodium) in about 200 parts of anhydrous liquid ammonia in a glass reactor fitted with a sealed stirrer and a reflux condenser cooled with solid carbon dioxide/acetone was added dropwise over a period of 20 minutes 19.2 parts (0.5 molar proportion based on the sodium amide) of 3-methyl-2-cyclopentene-1-one while maintaining the reactor at about $-33°$ C. A red-brown solid formed at once and after stirring the reaction mixture for one hour at this temperature, 12.7 parts (0.5 molar proportion based on the 3-methyl-2-cyclopenten-1-one) of anhydrous ferrous chloride was added in small portions over a period of 15 minutes. The resultant black reaction mixture was held at $-33°$ C. under reflux with stirring for an additional 75 minutes. No further solid carbon dioxide was packed into the reflux condenser and approximately one-half of the liquid ammonia was permitted to evaporate through the condenser. The remaining liquid ammonia was displaced by the addition of about 175 parts of anhydrous diethyl ether. The resulting black fluid reaction mixture was allowed to stand overnight under nitrogen at room temperature and then about 90% of it was poured under nitrogen into 250 parts of deoxygenated water containing eight parts of sodium hydroxide. After brief stirring the resultant black solid was removed by filtration under nitrogen. The red-yellow filtrate thereby obtained was shaken with cooling with 24 parts of benzoyl chloride and the resultant yellow-orange solid removed by filtration. After washing with 1% aqueous sodium hydroxide solution, dilute sodium bicarbonate solution, and finally with water, there was obtained after drying 15.3 parts (34% of theory) of crude bis(1-benzoyloxy-3-methylcyclopentadienyl)iron as a yellow-orange solid. After recrystallization from glacial acetic acid, the pure bis(1-benzoyloxy-3-methylcyclopentadienyl)iron was obtained as fine, yellow-orange needles, melting at 121.5–123.5° C. and soluble in ethanol, methylene chloride, acetone, and diethyl ether to give yellow-red solutions.

Analysis.—Calculated for $C_{26}H_{22}O_4Fe$: C, 68.7%; H, 4.9%; Fe, 12.3%. Found: C, 68.9%; H, 5.0%; Fe, 12.5%.

The crude product obtained above was a mixture of two stereoisomers which are separable by fractional crystallization. Thus, after several recrystallizations from acetic acid, the bis(1-benzoyloxy-3-methylcyclopentadienyl)iron was obtained as fine yellow crystals, melting at 123.5–125° C. After fractional crystallization of this material from n-heptane the high melting isomer (A) of bis(1-benzoyloxy-3-methylcyclopentadienyl)iron was obtained as thick clusters of fine, yellow-orange needles melting at 125.5–127° C. The acetic acid filtrates from the previous recrystallizations were combined and concentrated. Upon standing yellow-orange crystals of the low melting isomer (B) of bis(1-benzoyloxy-3-methylcyclopentadienyl)iron separated and after isolation by filtration were found to melt at 99–103° C. After fractional crystallization from n-heptane as described above, (B) was obtained as fine, long yellow-orange needles, melting at 104–105° C. Addition of approximately 5% of the high melting isomer (A) to the low melting isomer (B) depressed the melting point to 99–103° C.

Analysis.—Calculated for $C_{26}H_{22}O_4Fe$: C, 68.7%; H, 4.9%. Found [for the high melting isomer (A)]: C, 69.0%, 69.0%; H, 5.0%, 4.8%. Found [for the low melting isomer (B)]: C, 69.2%, 69.1%; H, 5.0%, 5.0%.

The infrared spectrum of a sample of the above low melting isomer of bis(1-benzoyloxy-3-methylcyclopentadienyl)iron, determined in carbon tetrachloride solution, exhibited strong absorption bands at $3.25\mu$, $3.4\mu$, and $5.76\mu$ which three bands are characteristic, respectively, for unsaturated C–H linkages, i. e., hydrogen bonded to an unsaturated carbon, saturated C–H linkages, i. e., hydrogen bonded to saturated carbon, and ester type carbonyl linkages. The spectrum also exhibited strong absorption bands at $6.75\mu$, $6.9\mu$, $7.3\mu$, $8.25\mu$, and $8.35\mu$, as well as several weaker bands, particularly at the longer wavelengths. These observations are consistent with the sandwich structure.

To a solution of 3 parts of potassium hydroxide in about 40 parts of methanol was added 2.3 parts of another sample of the above-described mixture of stereo-isomers of bis(1-benzoyloxy-3-methylcyclopentadienyl)-iron. The resultant orange solution was boiled for about 5 minutes during which it became green. About half the methanol was evaporated and the residue diluted with about 75–80 parts of freshly boiled distilled water. Acidification of the resultant light green solution resulted in a voluminous precipitate which redissolved on the addition of 5% aqueous sodium hydroxide to bring the pH to 10. The solution was used as a developer for a commercial Fine Grain Release Positive ciné film as follows:

| Exposure | Development | Result |
| --- | --- | --- |
| A. White light | 30 seconds | Very dense. |
| B. Short (quick flash to room lights—4–5 seconds). | 1 minute | Low density, plus fog on unexposed portion. |
| C. Short (same as B) | 3 minutes | Higher density plus greater fog. |
| To the same solution was added 10 parts of sodium metabisulfite and the following tests made: | | |
| D. Short (same as B) | 1 minute | Low density plus fog. |
| E. Short (same as B) | do | Do. |

The last test was made after the developer had remained standing overnight tightly stoppered.

The data reported in entries B and C show that the above compound of this invention functions as a selective developer with increasing development time in that it preferentially acts on the exposed areas of the film. The data in entries D and E show the relatively long range stability of the compounds of the present invention as regards their development action. The fact that the same degree of development action is also exhibited by the compound of this invention after standing overnight is to be contrasted with the extremely short-term life of many present-day commercial developers.

*Part B.—Preparation of bis(1-hydroxy-3-methylcyclopentadienyl)iron*

To a solution of 60 parts of absolute alcohol and 15 parts of water, which had been refluxed for five minutes to remove any absorbed air, was added three parts of the above bis(1-benzoyloxy-3-methylcyclopentadienyl)-iron. The system was thoroughly flushed with nitrogen and two parts of aqueous potassium hydroxide was then added. After refluxing the resulting red solution under nitrogen for 1.5 hours, the alcohol was then removed by distillation, additional deoxygenated water was added, and the solution was allowed to cool to room temperature under nitrogen. Upon acidification with hydrochloric acid, a yellow-orange solid formed which was removed by filtration under nitrogen. After being washed with deoxygenated water and a dilute aqueous sodium bicarbonate solution prepared from deoxygenated water, the crude bis(1-hydroxy-3-methylcyclopentadienyl)iron was obtained after drying as a yellow-orange solid, soluble in methylene chloride and insoluble in carbon tetrachloride, n-heptane, and petroleum ether. Sublimation at 130–140° C. under a pressure corresponding to 0.1 mm. of mercury in open ended glass vessels afforded the pure bis(1-hydroxy-3-methylcyclopentadienyl)iron as an orange-yellow solid, extremely sensitive to air.

The infrared spectrum of the pure bis(1-hydroxy-3-methyl cyclopentadienyl)iron determined as a mull in hexachlorobutadiene exhibited strong absorption bands at $3.25\mu$ and $3.4\mu$, which bands are characteristic, respectively, for unsaturated C–H linkages, i. e., hydrogen bonded to unsaturated carbon and saturated C–H linkages, i. e., hydrogen bonded to saturated carbon. The spectrum also exhibited strong absorption bands at $3.0\mu$, $3.7\mu$, and $3.9\mu$, which three bands are characteristic for hydroxyl and similar to that of phenol. As in the case of the preceding diester, the spectrum of the hydroxy compound also exhibited additional sharp bands, particularly at the longer wave lengths which observations are consistent with a sandwich type structure.

EXAMPLE II

*Preparation of bis(1-hydroxy-3-methylcyclopentadienyl)-cobalt (III) reineckate*

To a vigorously stirred suspension of sodium amide (from 10 parts of sodium) in about 200 parts of liquid ammonia in a reactor similar to that described in Example I was added dropwise over a period of 20 minutes 19.2 parts (0.46 molar proportion based on the sodium amide) of 3-methyl-2-cyclopenten-1-one. A red-brown solid was formed at once and the reaction mixture was stirred for 45 minutes at the reflux. Anhydrous cobaltous chloride (13 parts—0.5 molar proportion based on the 3-methyl-2-cyclopenten-1-one) was added in small portions with stirring over a period of 10 minutes. The resulting black reaction mixture was stirred at −33° C. under reflux and under an atmosphere of nitrogen for 2.5 hours. No further solid carbon dioxide was packed into the reflux condenser and approximately one-half of the liquid ammonia allowed to evaporate through the unpacked condenser. The remaining liquid ammonia was displaced by the addition of about 175 parts of anhydrous diethyl ether and the resulting mixture was then allowed to stand under an atmosphere of nitrogen overnight. A solution of 350 parts of deoxygenated water containing 25 parts of sodium hydroxide was added and after brief stirring the solid was removed by filtration under nitrogen. The resulting yellow-red filtrate was acidified to litmus with hydrochloric acid and approximately 20 parts of 3% aqueous hydrogen peroxide was added, followed by an excess of an aqueous solution of Reinecke salt [$NH_4Cr(NH_3)_2(SCN)_4 \cdot H_2O$]. The resultant orange-brown solid was removed by filtration and after drying there was thus obtained 3.5 parts (6% of theory) of the crude bis(1-hydroxy-3-methylcyclopentadienyl)cobalt (III) reineckate as an orange-brown powder melting at 154–157° C. with decomposition. After recrystallization from acetone/water the pure product was obtained as an orange-brown powder melting at 154–162° C. (dec.). The melting point range is due, as pointed out in Example I, part A, to a mixture of stereo-isomers.

*Analysis.*—Calculated for $C_{16}H_{20}O_2N_6S_4CoCr$: C, 33.9%; H, 3.6%; N, 14.8%. Found: C, 33.8%; H, 3.9%; N, 14.5%, 14.8%.

The foregoing examples are merely illustrative and the invention is generic to oxy-dicyclopentadienyl derivatives of transition metals of groups VI–VIII, wherein at least one oxy group is attached directly to nuclear carbon of at least one of the cyclopentadiene rings and wherein the cyclopentadiene ring carbons are annular members of only one ring. Because of readier availability of the necessary intermediates and greater ease in preparation, the preferred compounds are solely hydrocarbon in nature, other than hydroxyl (and esters, ethers, and salts therethrough), the transition metals of groups VI–VIII, and inorganic acid anions as and when needed to satisfy the valence of the transition metal. Thus, this invention includes in its preferred aspects the nuclear, mono-, di- or polyoxy derivatives of the dicyclopentadienyl metal and the alkyl, aryl, cycloalkyl, aralkyl and alkaryl nuclear hydrocarbon-substituted dicyclopentadienyl compounds of groups VI–VIII, and especially group VIII, transition metals and the inorganic acid salts thereof through the transition metal.

The new hydroxy-dicyclopentadienylmetal compounds of this invention are represented by the following structural formula:

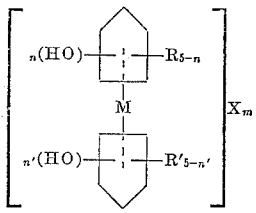

wherein $n$ and $n'$ are cardinal numbers, alike or different, and in each instance no greater than 5, with the sum of $n$ and $n'$ being at least 1; R and R' are hydrogen or monovalent, solely hydrocarbon radicals, alike or different, e. g., alkyl, aryl, cycloalkyl, aralkyl, or alkaryl radicals, each usually of no more than seven carbons, and preferably free from aliphatic unsaturation and most preferably of no more than four carbons apiece; M is a transition metal of groups VI–VIII, and especially group VIII, of the periodic table, preferably in the first long period thereof; $m$ is a small cardinal number generally not greater than 2, as required to satisfy the valence of said metal M; and X is an inorganic anion such as halide, nitrate, bromate, sulfate, phosphate, sulfonate, carbonate, ferricyanide, and the like. The R, R', and OH groups can be on any or all five carbons of each or both of the cyclopentadiene rings provided always there is at least one OH group on at least one of the said rings. Preferably, the sum of $n$ and $n'$ does not exceed two and most preferably at least one R or R' group on at least one of the cyclopentadiene rings is other than hydrogen, i. e., wherein at least one monovalent, solely hydrocarbon substituent is present on at least one of the cyclopentadiene rings. The invention also includes the esters, ethers, and salts, through the hydroxyl group, of the above hydroxy compounds.

The invention includes, in addition to the hydroxycyclopentadienylmetal compounds of the above examples, mono- and polyhydroxy-substituted dicyclopentadienylmetal compounds wherein there are no other substituents on either of the cyclopentadiene rings, such as bis(hydroxycyclopentadienyl)iron, cyclopentadienyl(hydroxycyclopentadienyl)iron, bis(hydroxycyclopentadienyl)chromium, bis(1,3-dihydroxycyclopentadienyl)iron, etc., as well as the hydroxy-substituted dicyclopentadienylmetal compounds of the transition metals of groups VI–VIII wherein one or both the cyclopentadiene nuclei carry one or more aromatic, aliphatic, araliphatic, alkaromatic or cycloaliphatic substituents in addition to at least one oxy substituent, e. g., bis(1-hydroxy-3-methyl-cyclopentadienyl)chromium, bis-(1 - hydroxy - 3,4-di-phenylcyclopentadienyl)manganese, bis(1,3 - dihydroxy-2,4 - diphenylcyclopentadienyl)iron, bis(1 - hydroxy - 3-cyclohexylcyclopentadienyl)ruthenium, bis(1-hydroxy-3-benzylcyclopentadienyl)nickel, bis(1 - hydroxy-3-p-tolyl-cyclopentadienyl)cobalt(III) reineckate cyclopentadienyl(1 - hydroxy - 3-methylcyclopentadienyl)iron, cyclopentadienyl(1 - hydroxy - 3,4 - diphenylcyclopentadienyl)iron, (1 - hydroxy - 3 - methylcyclopentadienyl) (phenylcyclopentadienyl)cobalt(III) tetrabromoferrate, (cyclohexylcyclopentadienyl)(1 - hydroxy - 3 - methyl-cyclopentadienyl)manganese, etc.

Thus, this invention is generic to the hydroxydicyclopentadienyl and nuclear hydrocarbon-substituted hydroxydicyclopentadienyl derivatives of transition metals of groups VI–VIII, wherein the ring carbons of both cyclopentadiene nuclei are annular members of only one ring and wherein at least one of the said cyclopentadiene rings carries at least one hydroxy substituent directly linked to nuclear carbon thereof. These hydroxy-substituted dicyclopentadienylmetal compounds are highly reactive and are normally isolated, purified, and preferably handled in the form of their ethers, esters, and salts, to which the invention is likewise generic. The ethers include those derivatives wherein the hydrogen of the hydroxy group on the cyclopentadiene ring or rings has been replaced by a monovalent wholly hydrocarbon radical free of aliphatic unsaturation and including the aliphatic, aromatic, alkaromatic, araliphatic and cycloaliphatic monovalent hydrocarbon radicals, e. g., methyl, propyl, benzyl, cyclohexyl, cyclohexylmethyl, phenyl, tolyl, and the like. The monovalent saturated hydrocarbon radicals of no more than seven carbons are preferred. The esters can be those of any organic mono- or polybasic acid and are preferably those of the wholly hydrocarbon carboxylic acids free of aliphatic unsaturation, including the aliphatic, aromatic, alkaromatic, araliphatic and cycloaliphatic monocarboxylic acids, e. g., acetic, propionic, benzoic, toluic, phenylacetic, cyclohexylacetic, cyclohexanecarboxylic acids, and the like. Acids of no more than seven carbons are preferred.

The salts through the hydroxyl group or groups can be those with any salt forming metal of which the alkali and alkaline metal are the most usual. The salts through the transition metal of groups VI–VIII can be those with any of the salt-forming acids, such as the mono-, di-, or tri-basic simple mineral acids, e. g., the hydrohalic acids, sulfuric acid, phosphoric acid, and the like, or the complex-forming inorganic acids or their soluble salts, such as the alkali and alkaline earth metal salts, the ammonium and substituted ammonium and amine salts. Suitable specific examples of such complex salt-forming compounds include the polytungstic and heteropolytungstic acids, e. g., polytungstic acid, phosphotungstic acid, and the salts thereof, e. g., ammonium phosphotungstate; the polymolybdic and heteropolymolybdic acids, and the salts thereof, e. g., sodium silicomolybdate, ammonium phosphomolybdate; the Reinecke salts; and the like.

In some instances the combined ester/salts are most useful or most convenient to isolate. In these compounds the nuclear hydroxy groups are linked as above described to acyl groups, preferably carbacyl groups, in the well known ester linkage and in addition the transition metal of groups VI–VIII is linked in ionic salt bonds with one of the aforesaid salt-forming acids, such as the simple sulfates, or preferably the complex-forming inorganic acids. Suitable examples of such ester/salts are indicated above, an illustration of such a compound of this invention being bis(1-benzoyloxy-3-methylcyclopentadienyl)iron(III)tetrabromoferrate.

As illustrated in the examples, the free hydroxy-substituted cyclopentadienylmetal compounds can be regenerated from these esters by simple base hydrolysis or from the salts, through the hydroxyl groups, by mild acid hydrolysis. Frequently the free hydroxy compounds are best obtained from mild acid solution following basic hydrolysis. The free hydroxy compounds can be purified by sublimation and are quite reactive materials, particularly to oxygen, and are preferably handled therefore in the absence of oxygen and conveniently under an atmosphere of nitrogen or under high vacuum techniques. The preferred purificaton method for the free hydroxy compounds is by sublimation onto a cold surface at elevated temperatures under greatly reduced pressures. Generally speaking, such sublimation purification is carried out in the range 50–150° C., using conveniently a water-cooled condensation surface, and operating at pressures in the range of 0.1 to 1.0 mm. of mercury.

As illustrated in the foregoing examples, the hydroxy-substituted dicyclopentadienyl group VI–VIII metal compounds of the present invention are conveniently prepared through the reaction under anhydrous, oxygen-free conditions of two molar proportions of an alkali metal amide in liquid ammonia and a cyclopentenone carrying at least two hydrogens on annular carbon followed by metathesis with a salt of the desired transition metal of groups VI–VIII. The alkali metal amide can be that of any of the alkali metals, e. g., lithium, sodium, potassium, and the like, but for obvious reasons of availability and costs the sodium and potassium amides are preferred. The cyclopentenones can have no more than one substituent on each annular carbon and must have at least two hydrogens on annular carbon, at least one of which is on annular carbon immediately adjacent to the annular carbon carrying the oxo oxygen, with the said adjacent hydrogen-bearing carbon carrying only single bonds. Thus, since there is one double bond internal to the ring structure and one externally bonded oxo oxygen the valence requirements permit no more than four substituents on the cyclopentenone ring. Thus, the cyclopentenones which can be used as intermediates in preparing the new compounds of this invention are described by the following two structural formulas which vary only in the position of the necessary intra-ring unsaturation.

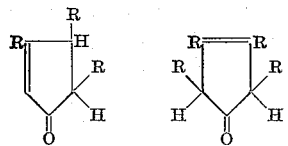

wherein the R's can be alike or different, and are used as before to represent hydrogen or monovalent solely hydrocarbon radicals, e. g., as indicated in the above specifically enumerated examples of the final products, such as alkyl, aryl, cycloalkyl, aralkyl, or alkaryl radicals, each usually of no more than seven carbons, and preferably free from aliphatic unsaturation and most preferably of no more than four carbons apiece. It is also preferred that no more than two aryl groups be on adjacent ring carbons. From the foregoing, it is apparent also that the mononuclearly unsaturated carbocyclic ketone, i. e., the cyclopentenones, can have the carbons of the 5-membered carbonyl-containing rings as members of that ring alone, i. e., the cyclopentenone ring carbons are annular members of no other ring.

Additional illustration of the new hydroxydicyclopentadienyl groups VI–VIII metal derivatives of the present invention is afforded by the reaction in liquid ammonia of 3-methyl-2-cyclopenten-1-one with two molar proportions, based on the ketone, of lithium amide, followed by reaction with anhydrous manganous chloride in 0.5 molar proportion, based on the ketone, resulting in the formation of bis(1-hydroxy-3-methylcyclopentadienyl)-manganese, conveniently isolated and characterized in the form of its stable dialkyl ethers, e. g., the dimethyl ether, by reacting the aqueous sodium hydroxide solution with, for example, dimethyl sulfate.

Similarly the reaction of 3-methyl-2-cyclopenten-1-one in liquid ammonia with two molar proportions of potassium amide, based on the ketone, followed by reaction with anhydrous hexaamminochromium(III) nitrate in 0.5 molar concentration, based on the ketone, results in a product, which on warming with dilute alkali and followed by acidification yields bis(1-hydroxy-3-methylcyclopentadienyl)chromium.

The preparation of (cyclopentadienyl)(1-hydroxy-3-methylcyclopentadienyl)iron can be achieved by the reaction of 6 molar proportions of sodium amide with one molar proportion of 3-methyl-2-cyclopenten-1-one and 4 molar proportions of cyclopentadiene, followed by the addition of 2.5 molar proportions of ferrous chloride, all operations being conducted in liquid ammonia. The ammonia is allowed to evaporate, deoxygenated water added, and the resulting mixture filtered. The insoluble fraction contains some dicyclopentadienyl iron, and the aqueous filtrate is reacted with benzoyl chloride to yield a mixture of bis(1-benzoyloxy-3-methylcyclopentadienyl)-iron and (cyclopentadienyl)(1-benzoyloxy-3-methylcyclopentadienyl)iron. Fractional crystallization from methanol yields the desired (cyclopentadienyl)(1-benzoyloxy-3-methylcyclopentadienyl)iron.

The new hydroxydicyclopentadienyl group VI–VIII metal compounds of this invention, including the nuclear hydrocarbon-substituted hydroxydicyclopentadienyl group VI–VIII metal compounds, no matter what preparative means are used, are generally isolated from the reaction mixture and purified in the form of their salts, through either the metal or the hydroxyl, generally the former, or ethers or esters through the hydroxyl group or groups and particularly the esters of the monobasic carboxylic acids. These organic acid esters are conveniently formed under conventional Schotten-Baumann conditions by simply adding an excess of the required carboxylic acid halide under alkaline conditions to the filtrate from the water-quenched reaction mixture after all insoluble by-products have been removed, i. e., to a solution of the alkali or alkaline earth metal salt through the hydroxyl group of the hydroxymetallocene. The ethers may be obtained from the solution of the alkali metal salt of the hydroxy compound by reaction with alkylating agents, particularly dimethyl sulfate. The organic acid ester separates as a solid which is removed by filtration and further purified by conventional recrystallization procedures. Suitable unreactive liquid organic solvents commonly used in recrystallization of organic compounds are likewise useful here, e. g., the aliphatic and aromatic hydrocarbons, such as benzene, the xylenes, n-hexane, and the like; halogenated aliphatic and aromatic hydrocarbons, e. g., chloroform, the chlorobenzenes, and the like; the hydrocarbon ethers, e. g., diethyl ether, di-n-butyl ether, and the like; or the substantially anhydrous organic acids, such as glacial acetic acid, and the like.

Like other of the peculiar dicyclopentadienylmetal compounds recently reported in the literature, as mentioned in the foregoing, these new oxy-substituted dicyclopentadienyl group VI–VIII metal compounds have two cyclopentadiene radicals directly linked through carbon thereof to the respective metal atom. Furthermore, the two cyclopentadiene nuclei are each singly bonded to the said metal and yet all the carbons of each cyclopentadiene ring are identically bonded, i. e., the formal valence bond of each ring to the metal atom is not centered in any one of the five-ring carbons but equally in all. The structure of the over-all molecule is similar to that of a sandwich wherein the planes of the two cyclopentadiene rings are essentially parallel, with the metal atom equidistant therebetween. Many recent references in the literature reporting on ultraviolet, X-ray, and infrared properties and other fundamental physical studies capable of defining the molecular geometry of these compounds attest to the foregoing peculiar structure for other dicyclopentadienyl metal compounds. See, for instance, Wilkinson et al., J. Am. Chem. Soc. 74, 2125 (1952), Woodward et al., ibid., 3458; Eiland et al., ibid., 4971; Fischer et al., Z. f. Naturforschung, 7B, 377 (1952); and Dunitz et al., Nature, 171, 121 (1953).

The new hydroxydicyclopentadienyl group VI–VIII metal compounds of this invention, including the nuclear hydrocarbon substituted hydroxydicyclopentadienyl metal compounds are colored, reactive solids, exhibiting infrared spectra containing a strong absorption band at $3.25\mu$, which is characteristic for unsaturated C–H linkages as well as strong bands at $3.0\mu$, $3.7\mu$, and $3.9\mu$, which are characteristic for the hydroxyl group and quite similar to those of phenol. The spectra also exhibit sharp bands at the longer wave lengths. The esters of these hydroxy compounds are in general colored, crystalline solids, soluble in a wide range of organic solvents and characterized by ready handleability and good stability, making them ideal intermediates for the preparation of other new and interesting dicyclopentadienyl group VI–VII metal compounds. The esters exhibit infrared spectra containing characteristic strong absorption bands at $3.25\mu$ and $5.76\mu$, which are characteristic, respectively, for unsaturated C–H linkages and ester-type carbonyl. The spectra also exhibit strong absorption bands at the longer wave lengths. The infrared spectra of the hydroxy and ester compounds are consistent with a sandwich-type structure, particularly in not exhibiting several of the bands characteristic for the simple sandwich compounds such as dicyclopentadienyliron itself. As pointed out by Pauson, J. Am. Chem. Soc. 76, 2187 (1954), the intermediate infrared absorption bands characteristic for the simple unsubstituted sandwich compounds disappear when both cyclopentadiene rings are substituted, with more bands disappearing as substitution increases.

The hydroxy compounds and their esters, ethers and salts are useful as pesticides and as anti-knock agents in spark-ignition motor fuels, dye intermediates, etc., in which latter uses the hydroxy substituents are of particular significance in increasing appreciably the chemical reactivity of the compounds over corresponding compounds not containing the oxy substituent.

They are effective as plant nutrients in overcoming or combating iron deficiency, i. e., agents for prevention of iron chlorosis, which is a current problem, particularly in citrus culture. The esters and simple salts through the hydroxyl group are especially useful in this respect being applied directly to the plant in aqueous solution at concentrations as low as 0.055 part per 800 parts of water.

As illustrated in the examples, these new compounds or their salt, ether, or ester derivatives are useful as photographic developers. The oxycyclopentadienyl metal compounds, especially the free hydroxy compounds, are also of utility in the formation of new condensation polymers of the phenol formaldehyde type, i. e., they may be reacted with formaldehyde or a formaldehyde generating derivative at temperatures varying from room temperature to about 100° C., preferably in the presence of catalytic amounts of strong mineral acids to form polymeric products ranging from low melting thermosettable resins to infusible, insoluble products varying with the temperature and time of reaction, and the relative concentrations of formaldehyde and the acid catalyst. These polymeric products are believed to have a plurality of the oxymetallocene structures linked together through methylene or polymethylene bridges.

The periodic table of the specification and claims is the usual one as given, for example, in Deming—General Chemistry 5th edition, Wiley, 1944).

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. Bis(1-hydroxy-3-methylcyclopentadienyl)iron.

2. The dibenzoate of bis(1-hydroxy-3-methylcyclopentadienyl)iron.

3. A compound of iron wherein the iron atom is directly bonded to two cyclopentadienyl nuclei, each of which nuclei has directly, singly, and separately attached to different nuclear carbons thereof, as the sole substituents on said nuclei other than said iron atom, one hydroxyl radical and one alkyl radical of not more than four carbon atoms.

4. A compound of iron wherein the iron atom is directly bonded to two cyclopentadienyl nuclei, each of which nuclei has directly, singly, and separately attached to different nuclear carbons thereof, as the sole substituents on said nuclei other than said iron atom, one hydroxyl radical and one monovalent hydrocarbon radical, free from aliphatic unsaturation, and of not more than seven carbon atoms.

5. A compound of iron wherein the iron atom is directly bonded to two cyclopentadienyl nuclei, each of which nuclei has directly, singly and separately attached to different nuclear carbons thereof, as the sole substituents on said nuclei other than said iron atom, at least one and not more than two hydroxyl radicals per each of said nuclei, and at least one and not more than two monovalent hydrocarbon radicals per each of said nuclei, said hydrocarbon radicals being free from aliphatic unsaturation, and each of not more than seven carbon atoms.

6. A compound of iron wherein the iron atom is directly bonded to two cyclopentadienyl nuclei, each of which nuclei has directly, singly, and separately attached to different nuclear carbons thereof at least one and not more than two hydroxyl radicals per each of said nuclei, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

7. A compound of iron wherein the iron atom is directly bonded to two cyclopentadienyl nuclei, at least one of which nuclei has directly attached to a nuclear carbon thereof a hydroxyl radical, each of said cyclopentadienyl nuclei having a total of not more than two hydroxyl radicals separately attached to different nuclear carbons thereof, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

8. A compound of a transition metal from the first long series of group VIII of the periodic table wherein said transition metal is directly bonded to two cyclopentadienyl nuclei, at least one of which nuclei has directly attached to a nuclear carbon thereof a hydroxyl radical, each of said cyclopentadienyl nuclei having a total of not more than two hydroxyl radicals separately attached to different nuclear carbons thereof, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

9. A compound of a transition metal from group VIII of the periodic table wherein said transition metal is directly bonded to two cyclopentadienyl nuclei, at least one of which nuclei has directly attached to a nuclear carbon thereof a hydroxyl radical, each of said cyclopentadienyl nuclei having a total of not more than two hydroxyl radicals separately attached to different nuclear carbons thereof, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

10. A compound of a transition metal from groups VI to VIII of the periodic table wherein said transition metal is directly bonded to two cyclopentadienyl nuclei, at least one of which nuclei has directly attached to a nuclear carbon thereof a hydroxyl radical, each of said cyclopentadienyl nuclei having a total of not more than two hydroxyl radicals separately attached to different nuclear carbons thereof, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

11. A compound of a transition metal from groups VI to VIII of the periodic table wherein said transition metal is directly bonded to two cyclopentadienyl nuclei at least one of which nuclei has directly attached to a nuclear carbon thereof an oxy-oxygen, each of said cyclopentadienyl nuclei having a total of not more than two oxy-oxygens separately attached to different nuclear carbons thereof with each oxy-oxygen being directly and singly attached to a member selected from the class consisting of hydrogen, monovalent hydrocarbon radicals free from aliphatic unsaturation and each of not more than seven carbon atoms, carbacyl radicals free from aliphatic unsaturation and each of not more than seven carbon atoms, and alkali metals, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

12. A compound of iron wherein the iron atom is directly bonded to two cyclopentadienyl nuclei, each of which nuclei has directly, singly, and separately attached to different nuclear carbons thereof, as the sole substituents on said nuclei other than said iron atom, one alkyl radical of not more than four carbon atoms and one carbacyloxy radical, free from aliphatic unsaturation and of not more than seven carbon atoms.

13. A compound of iron wherein the iron atom is directly bonded to two cyclopentadienyl nuclei, at least one of which nuclei has directly attached to a nuclear carbon thereof a carbacyloxy radical, free from aliphatic unsaturation and of not more than seven carbon atoms, each of said cyclopentadienyl nuclei having a total of not more than two carbacyloxy radicals separately attached to different nuclear carbons thereof, the remaining valences of the nuclear carbons of each cyclopentadienyl nuclei being satisfied, other than by hydrogen, solely and separately with a total of not more than two monovalent hydrocarbon radicals per each of said nuclei, said hydrocarbon radicals being free from aliphatic unsaturation, and each of not more than seven carbon atoms.

14. An ester of bis(1-hydroxy-3-methylcyclopentadienyl)iron with a hydrocarbon carboxylic acid, free from aliphatic unsaturation, and of not more than seven carbon atoms.

15. An ester of a bis(1-hydroxy-3-methylcyclopentadienyl)metal, wherein the metal is from the first long series of group VIII of the periodic table, with a hydrocarbon carboxylic acid, free from aliphatic unsaturation, and of not more than seven carbon atoms.

16. Process which comprises bringing into contact and reacting in anhydrous liquid ammonia an alkali metal amide with a cyclopentenone having as the sole substituents, other than carbonyl oxygen, at most two monovalent hydrocarbon radicals free from aliphatic unsaturation and each of not more than seven carbon atoms, each of said monovalent hydrocarbon radicals being attached to separate annular carbons of said cyclopentenone, and thereafter reacting the resulting dialkali metallated product with a salt of a transition metal from groups VI to VIII of the periodic table, and obtaining as the resulting product an oxy-substituted dicyclopentadienyl compound of a transition metal from groups VI to VIII of the periodic table.

17. Process which comprises bringing into contact and reacting in anhydrous liquid ammonia an alkali metal amide with a cyclopentenone having as the sole substituents, other than carbonyl oxygen, at most two monovalent hydrocarbon radicals free from aliphatic unsaturation and each of not more than seven carbon atoms, each of said monovalent hydrocarbon radicals being attached to separate annular carbons of said cyclopentenone, and thereafter reacting the resulting dialkali metallated product with a salt of a transition metal from group VIII of the periodic table, and obtaining as the resulting product an oxy-substituted dicyclopentadienyl compound of a transition metal from group VIII of the periodic table.

18. Process which comprises bringing into contact and reacting in anhydrous liquid ammonia an alkali metal amide with a cyclopentenone having as the sole substituents, other than carbonyl oxygen, at most two monovalent hydrocarbon radicals free from aliphatic unsaturation and each of not more than seven carbon atoms, each of said monovalent hydrocarbon radicals being attached to separate annular carbons of said cyclopentenone, and thereafter reacting the resulting dialkali metallated product with a salt of a transition metal from the first long series of group VIII of the periodic table, and obtaining as the resulting product an oxy-substituted dicyclopentadienyl compound of a transition metal from the first long series of group VIII of the periodic table.

19. Process which comprises bringing into contact and reacting in anhydrous liquid ammonia an alkali metal amide with a cyclopentenone having as the sole substituents, other than carbonyl oxygen, at most two monovalent hydrocarbon radicals free from aliphatic unsaturation and each of not more than seven carbon atoms, each of said monovalent hydrocarbon radicals being attached to separate annular carbons of said cyclopentenone, and thereafter reacting the resulting dialkali metallated product with a salt of iron, and obtaining as the resulting product an oxy-substituted dicyclopentadienyliron compound.

20. Process which comprises bringing into contact and reacting in anhydrous liquid ammonia an alkali metal amide with a cyclopentenone having as the sole substituent, other than carbonyl oxygen, one monovalent hydrocarbon radical free from aliphatic unsaturation and of no more than seven carbon atoms, and thereafter reacting the resulting dialkali metallated product with a salt of iron, and obtaining as the resulting product an oxy-substituted dicyclopentadienyliron compound.

21. Process which comprises bringing into contact and reacting in anhydrous liquid ammonia an alkali metal amide with a cyclopentenone having as the sole substituents, other than carbonyl oxygen, an alkyl radical of no more than four carbon atoms, and thereafter reacting the resulting dialkali metallated product with a ferrous halide, and obtaining as the resulting product an oxy-substituted dicyclopentadienyliron compound.

22. Process which comprises bringing into contact and reacting in anhydrous liquid ammonia sodium amide with 3-methyl-2-cyclopenten-1-one, and thereafter reacting the resulting disodium metallated product with ferrous chloride, and obtaining as the resulting product bis(1-hydroxy-3-methylcyclopentadienyl)iron.

23. Process which comprises bringing into contact and reacting in anhydrous liquid ammonia an alkali metal amide with a cyclopentenone having as the sole substituents, other than carbonyl oxygen, at most two monovalent hydrocarbon radicals free from aliphatic unsaturation and each of not more than seven carbon atoms, each of said monovalent hydrocarbon radicals being attached to separate annular carbons of said cyclopentenone, and thereby obtaining a dialkali metallated cyclopentenone.

24. Process which comprises bringing into contact and reacting in anhydrous liquid ammonia an alkali metal amide with a cyclopentenone having as the sole substituent, other than carbonyl oxygen, an alkyl radical of no more than four carbon atoms, and thereby obtaining a dialkali metallated alkylcyclopentenone.

25. Process which comprises bringing into contact and reacting in anhydrous liquid ammonia sodium amide with 3-methyl-2-cyclopenten-1-one, and thereby obtaining the disodium metallated 3-methyl-2-cyclopenten-1-one.

References Cited in the file of this patent

UNITED STATES PATENTS 2,683,157   Weirmayr _____ July 6, 1954

OTHER REFERENCES

Woodward et al.: Jour. Amer. Chem. Soc., vol. 74, pp. 3458–59, July 1952.

Paulson: Jour. Amer. Chem. Soc., vol. 76, pp. 2187–2191, April 20, 1954.

Rosenblum: The Structure and Chemistry of Ferrocene, A Thesis Presented to the Dept. of Chem., Harvard Univ., Cambridge, Mass., August 1953; deposited in the Harvard Univ. Lib. February 19, 1954; page 37.

UNITED STATES PATENT OFFICE
Certificate of Correction

August 26, 1958

Patent No. 2,849,470

Richard Edward Benson

It is hereby certified that error appears in the printed specification of the above numbered patent requiring correction and that the said Letters Patent should read as corrected below.

Column 3, lines 30 to 42, in the table, heading to second column thereof, for "Development" read —Development Time—; column 7, lines 30 to 36, the left-hand portion of the formula should appear as shown below instead of as in the patent—

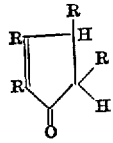

Signed and sealed this 18th day of November 1958.

[SEAL]

Attest:
KARL H. AXLINE,
*Attesting Officer.*

ROBERT C. WATSON,
*Commissioner of Patents.*